United States Patent Office 2,735,923
Patented Feb. 21, 1956

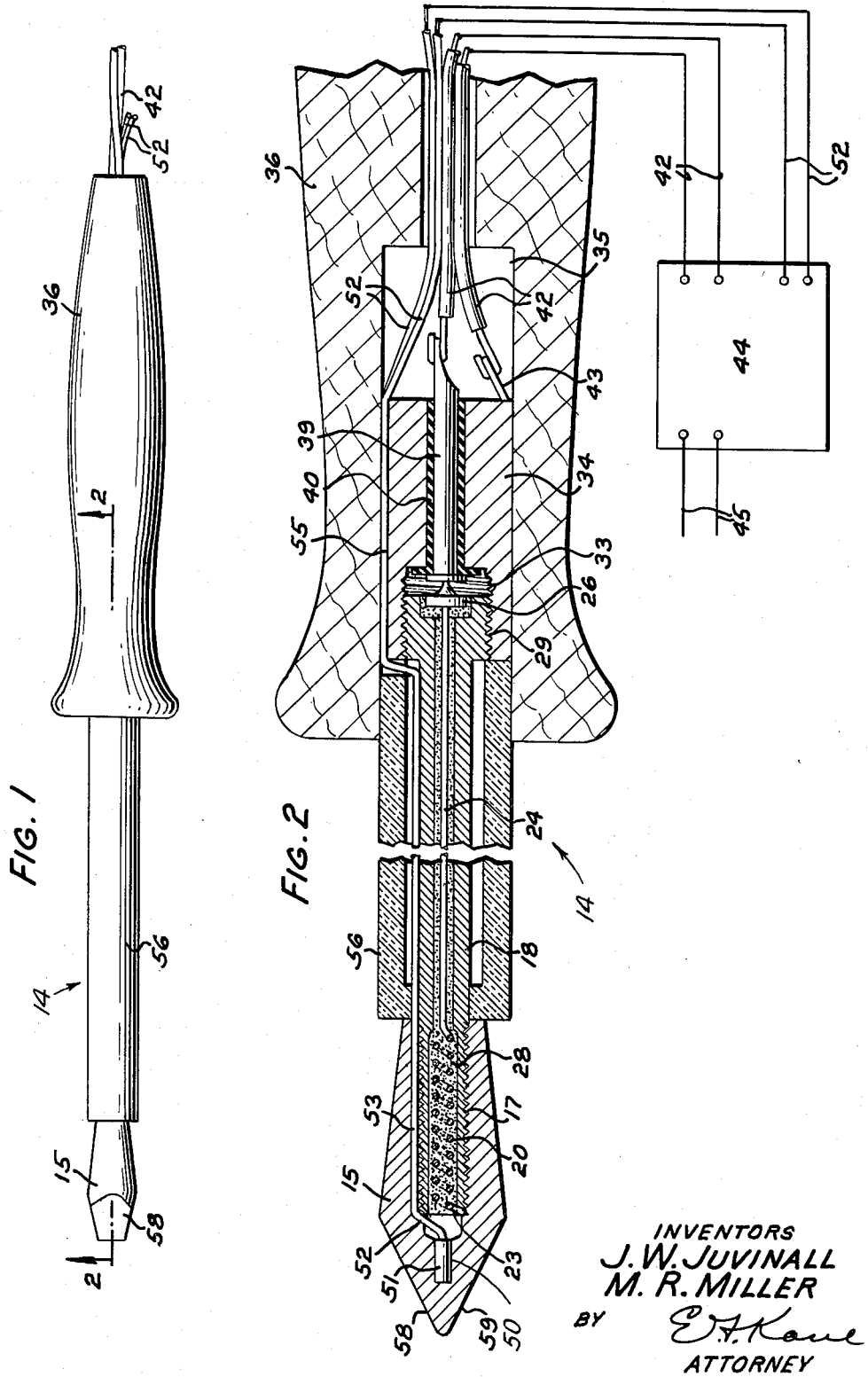

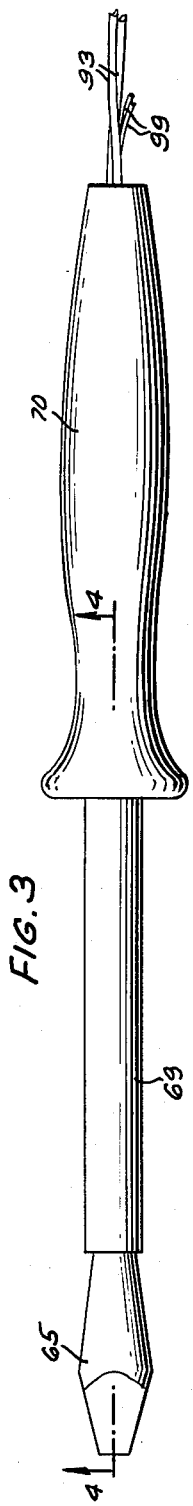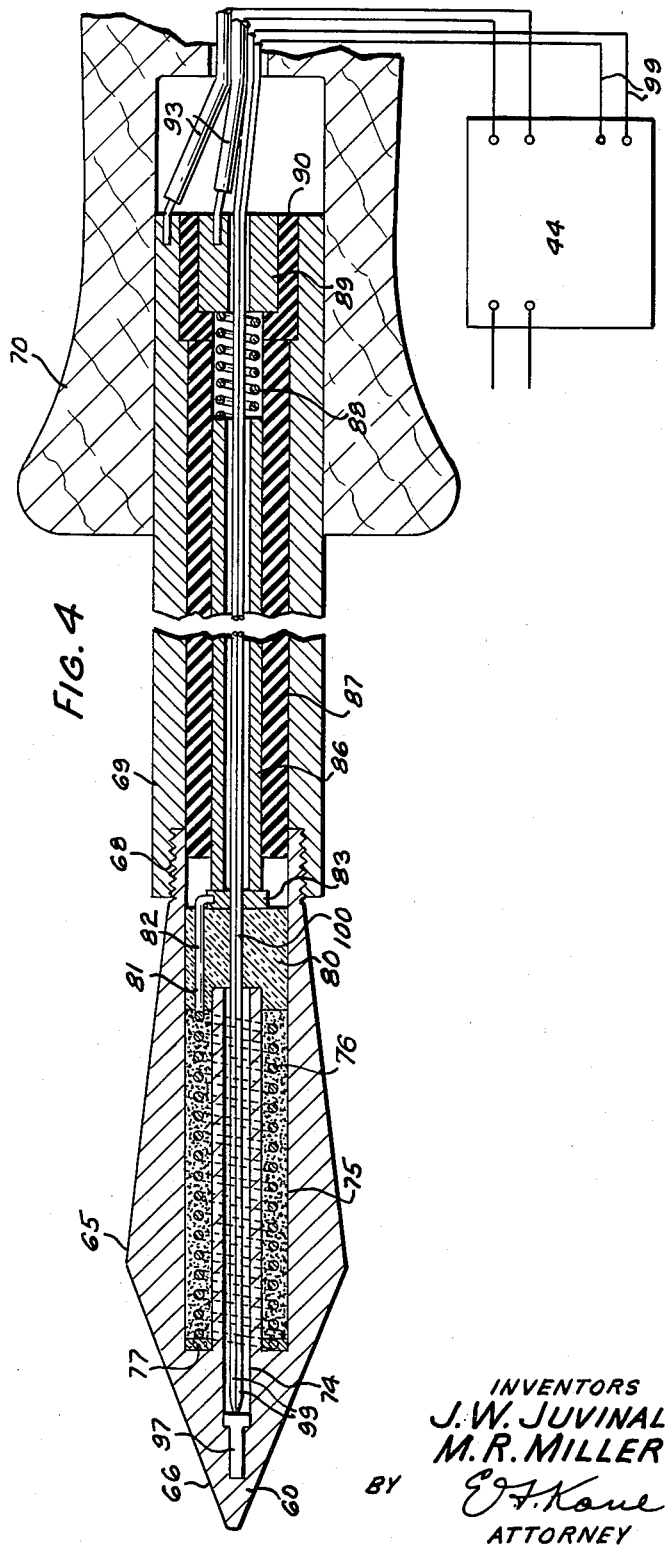

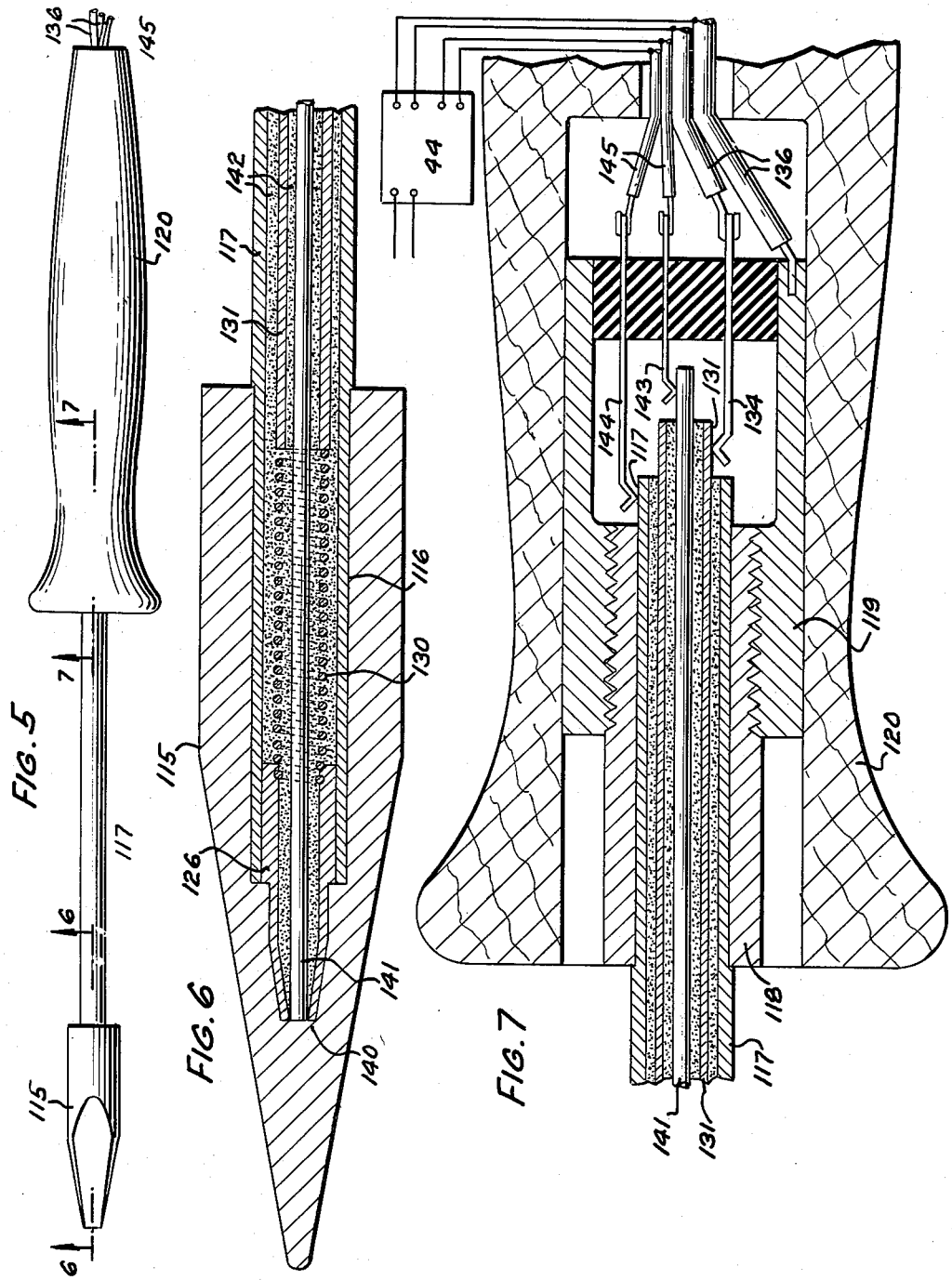

2,735,923

TEMPERATURE-CONTROLLED SOLDERING IRON

James W. Juvinall, La Grange Park, and Merton R. Miller, Lombard, Ill., assignors to Western Electric Company, Incorporated, New York, N. Y., a corporation of New York Application December 29, 1948, Serial No. 67,814

10 Claims. (Cl. 219—26)

This invention relates to a temperature-controlled soldering iron and more particularly to an electrically heated soldering iron having a thermo-responsive control element positioned in the tip of the soldering iron adjacent the work area thereof for actuating a remote control apparatus to vary the power supplied to the soldering iron for maintaining a relatively constant temperature in the tip of the soldering iron.

In temperature-controlled soldering irons of commercial types heretofore known, the temperature of the soldering iron is controlled by a thermostatic switch, which is located at a point so remote from the work area of the soldering iron that it does not respond to the varying temperature of the work area of the soldering iron with sufficient accuracy to function satisfactorily and maintain a substantially uniform temperature at the work area of the soldering iron. When using the soldering iron to rapidly solder a substantial quantity of work, the heat at the work area of the soldering iron is dissipated so rapidly as to cause a drop in the temperature to an unsatisfactory low value and thereby prevent the continued operation of the soldering iron at a high level of efficiency.

When the temperature in the tip of a soldering iron is allowed to rise above a critical value on the order of about 900° F., the tinning on the tip is adversely affected. Excessive heat causes a rapid deterioration of the tinning on the tips of soldering irons and especially those of the iron clad copper type so that it is essential to control the upper level of temperature as well as the lower level of the soldering iron tip to obtain a long life for the soldering iron and for the effective and efficient use thereof.

It is an object of the present invention to provide a temperature-controlled soldering iron of improved construction and having a thermo-responsive control element therein for use with a remote control device for varying the heating current supplied to the soldering iron in order to maintain the working surface of the soldering iron tip at a substantially uniform temperature.

In accordance with one embodiment of the invention in a temperature-controlled soldering iron for use with a remote control device for regulating the current supply to the iron, there is provided an elongated metal tip having a longitudinally directed recess formed therein with a thermocouple mounted in the forward end of the recess adjacent the soldering or working area of the tip and a heating element spaced from the thermocouple and disposed along the remaining portion of the recess. A hollow supporting rod, in the forward end of which the heating element is mounted, is threaded at its forward end into the recess in the tip and is provided at its other end with a handle. The heating element is electrically connected to the power circuit of an electronic remote control unit which is connected to a source of electrical power. Connected to the control circuit of the remote control unit and affected by the variation in temperature of the tip, the thermocouple develops a correspondingly varying potential which causes the control unit to vary the supply of current to the heating element of the soldering iron to maintain the tip at substantially uniform temperature.

In another embodiment of the invention the tip, which is secured to one end of a tubular supporting member, has mounted in an annular recess therein a helical heating element which is electrically connected to the power circuit of the control unit, and the thermocouple, which is positioned in the forward end of the tip adjacent the work area thereof, is electrically connected to the control circuit of the remote control device by conductors passing axially through the helical heating element and the tubular supporting member.

In another form of construction the recessed tip is secured to one end of a tubular supporting member which at one end is electrically connected to one end of a helical heating element mounted in the end thereof and to one side of a thermocouple mounted in the tip adjacent the work area thereof and which serves as a common conductor to the heating element and the thermocouple. A return conductor from the thermocouple extends longitudinally through the heating element and the hollow supporting rod, and a return conductor from the heating element extends longitudinally through the hollow supporting member. One terminal for each of the return conductors and two terminals for the common conductor are provided on the soldering iron whereby individual leads from the remote control unit may be connected thereto to furnish separate paths between the soldering iron and the control unit for the heating current supplied to the heating element and the control current supplied by the thermocouple.

Other features and advantages will be apparent by reference to the following description thereof and the accompanying drawings illustrating several embodiments of the invention wherein Fig. 1 is a side elevational view of one form of construction of soldering iron;

Fig. 2 is an enlarged, fragmentary, longitudinal, sectional view of the soldering iron taken on the line 2—2 of Fig. 1 and showing the soldering iron connected diagrammatically to an electronic remote control unit;

Fig. 3 is a side elevational view of another form of construction of the soldering iron;

Fig. 4 is an enlarged, fragmentary, longitudinal, sectional view of the soldering iron taken on the line 4—4 of Fig. 3;

Fig. 5 is a side elevational view of still another embodiment of the soldering iron; and Figs. 6 and 7 are enlarged, fragmentary, longitudinal, sectional views through the soldering iron taken on the lines 6—6 and 7—7, respectively, of Fig. 5.

Referring to Figs. 1 and 2 of the drawings, wherein one embodiment of the invention is disclosed, the soldering iron 14 comprises an elongated metal tip or bit 15 provided with an internally threaded axially disposed bore or recess 17, into which is threaded one end of a metal rod 18. The rod 18, which engages the tip 15 over a substantial portion of its length, is hollow and has mounted in its forward end a heating element 20 in the form of a helical resistance wire. One end 23 of the heating element 20 is connected, as by brazing, to the forward end of the rod 18, and the other end 24 of the heating element extends axially through the rod 18 and is secured to a terminal member 26 disposed in the end of the rod. The terminal 26 and the resistance element 20, except for the connection 23, are insulated from the rod by suitable insulation 28, as for example, compacted powdered magnesium oxide. The rear end of the rod 18 is enlarged and threaded, as at 29, and is mounted in a threaded recess 33 of a cylindrical metal socket member 34 which, in turn, is telescopingly received in an axial aperture 35 of a handle 36.

A terminal member 39, axially mounted in a central bore 40 of the socket member 34 and suitably insulated therefrom, at one end engages the terminal 26 and at its other end is connected to one of a pair of conductors 42 extending axially through a reduced portion of the aperture 35 in the handle 36. The other one of the pair of conductors 42 is connected to a terminal 43 secured to the socket member 34. The conductors 42 are connected to terminals of the power circuit of an electronic remote control unit 44 which is connected to a power line 45 and supplies current to the heating element 20 to heat the tip 15 of the soldering iron.

In the reduced end portion 50 of the recess 17 in the tip 15 is positioned a thermocouple 51 which is made from two different metals, as for example, steel and Alumel. A pair of insulated electrical conductors or leads 52 connect the thermocouple 51 with the control circuit of the electronic control unit 44. The conductors 52 pass through a groove 53 formed in the tip 15 and extend longitudinally along the rod 18 through a groove 55 formed in the socket member 34 and through the central aperture of the handle 36 of the soldering iron, as indicated in Fig. 2 of the drawings. A sleeve 56 of insulating material may enclose the exposed portion of the rod 18 and a portion of the leads 52. The thermocouple 51 is positioned adjacent the forward end of the tip 15 in close proximity to the work or soldering area of the converging surfaces 58 and 59 of the front end of the tip 15. Thus, any variations in the temperature of the tip due to loss of heat therein, while the iron is either idle or being used for soldering, immediately affects the thermocouple 51 and varies the potential produced thereby. Variations in potential in the thermocouple 51, caused by the variations in temperature in the tip at the work area, are transmitted to the control circuit of the control unit 44 and serve to regulate the control unit to vary the amount of current supplied to the heater element 20 as to maintain a relatively constant temperature in the tip 15.

In the embodiment of the invention shown in Figs. 3 and 4 the soldering iron comprises a metal tip 65 having a pair of diverging faces 66—66 at its forward end with the soldering or work area located thereon adjacent the juncture of the faces. At its other end the tip 65 is formed with a threaded cylindrical portion 68 which is secured in a threaded recess in the forward end of a hollow metal rod or tube 69 for supporting the tip 65. The rod 69, at its opposite end, has a handle 70 telescopingly mounted thereon. The tip 65 is provided with a central bore or recess 74 and a coaxial annular recess 75 extending inwardly from the rear end thereof. In the recess 75 a helical resistance heating element 76 is mounted and has its forward end electrically connected to the tip 65 by a ring 77 of silver solder, the rest of the heating element 76 being suitably insulated from the tip 65. A cylindrical ceramic plug 80, secured in the enlarged cylindrical recess formed in the end of the tip 65, serves to retain the heating element 76 and insulation therefor in position. Extending through an axially directed aperture 81 in the ceramic plug 80 is an end portion 82 of the heating element 76, which end 82 is electrically connected to a metal contact ring 83 suitably secured to the ceramic plug 80.

A conductor 86, in the form of a metal tube mounted within the hollow rod 69 and supported in spaced relation thereto by an insulating sleeve 87, is held in engagement with the contact 83 by a helical compression spring 88. The spring 88 seats against an annular metal sleeve 89 which is mounted in an insulating sleeve 90 secured in telescoping relation within the hollow rod 69. A pair of conductor leads 93—93, electrically connected at one end to the hollow rod 69 and the member 89, is connected at the other end to terminals of the power circuit of the electronic control unit 44. Thus, current from the control unit may flow through one conductor 93, the member 89, spring 88, the tubular conductor 86, contact member 83, through the heater element 76, the tip 65, the hollow rod 69, the other conductor 93 to the control unit and serves to energize the heating unit 76 and heat the tip 65.

A thermocouple 97 is driven into the end of the central recess 74 and a pair of insulated leads 99—99 extend rearwardly therefrom through the recess 74, an axial aperture 100 in the ceramic plug 80, through the tubular conductor 86 and the central aperture in the handle 70 and is connected at the other end to terminals in the control circuit of the control unit 44. The thermocouple 97 is positioned in close proximity to the work area of the tip 65 and is directly affected by any variation in the temperature at the work area of the iron. Thus, any variation in temperature in the tip 65 at the work area will immediately affect the thermocouple and vary the electromotive force produced thereby which will cause a corresponding adjustment in the control unit 44 to vary the amount of current supplied to the heating element and thus maintain the heat at the work area of the tip 65 at a relatively constant temperature.

Another embodiment of the invention is shown in Figs. 5, 6 and 7 and comprises a metal bit or tip 115 having a longitudinal central aperture 116 for receiving one end of a metal supporting tube 117. A metal sleeve 118, brazed in telescoping relation on the other end of the tube 117, is threadedly secured to a tubular contact supporting member or jack 119 which in turn is telescopingly mounted within a hollow handle 120. Brazed to the forward end of the supporting tube 117 is a tubular member 126 having cylindrical and conical portions extending forwardly from the tubular member 117 and fitting into a conforming portion of the recess 116 in the tip 115. A helical resistance heating element 130, telescopingly mounted in coaxial and spaced relation to the tubular member 117, has its forward end telescopingly engaging and bonded to the member 126. A tubular metal conductor 131, coaxially mounted within the tubular member 117, engages the other end of the heating element 130 and extends rearwardly therefrom and has a portion extending beyond the end of the tube 117. A spring contact 134, mounted in and insulated from the jack 119, engages the end of the tubular conductor 131, and a pair of conductors 136—136, connected at one end to the member 119 and the spring contact 134, is connected at the other end to the power supply terminals of the control unit 44. Thus, current from the control unit 44 flowing through one conductor 136, members 119, 118, 117 and 126, the heater element 130, the member 131, spring contact 134 and the other conductor 136, serves to heat the element 130 and the tip 115 of the soldering iron.

The tubular member 126, disposed in the forward end of the tip 115, forms one element of a thermocouple 140, the other element 141 of which is a rod or wire conductor disposed within the tubular members 117 and 131 and brazed at its forward end of the element 126. The heating element 130 and the tubular conductor 131 are insulated from the element 141 and from the tubular supporting member 117 by suitable insulation 142, as for example, compacted powdered magnesium oxide. The thermocouple 140 may be made from suitable metals, as for example, the element 126 may be made of steel and the element 141 may be made of Alumel. Extending rearwardly beyond the tubular conductor 131, the end of the element 141 of the thermocouple is engaged by a spring contact 143 mounted in and insulated from the jack 119. A spring contact 144 mounted in and insulated from the jack 119 engages the end of the tubular member 117 which serves as a conductor for element 126 of the thermocouple 140, and a pair of conductors 145—145 are connected at one end to the spring contact members 143 and 144 and at the other end to the control circuit terminals of the control unit 44. Thus, the thermocouple circuit from the control unit 44 is through one conductor 145, spring contact member 143, the thermocouple element 141, to the thermocouple 140 and through the thermocouple element 126, the tube 117, the spring contact member 144, the other conductor 145, and back to the control unit 44. The sleeve 17, which at its forward end is electrically connected to the element 126 of the thermocouple and to one end of the heating element 130, serves as a common conductor to the thermocouple 140 and to the heating element 130.

The thermocouple 140, the heating element 130, and the conductors 117, 131 associated therewith, form a composite unitary structure to which the tip 15 is secured as by being brazed thereto. When the tip has become worn, it may be heated and removed from the heater and thermocouple structure and a new tip substituted therefor.

With the thermo-sensitive control element centrally mounted in the forward end of the tip adjacent the work surfaces and the helical heating element centrally mounted in the tip rearwardly of the control element, a light weight temperature controlled soldering iron may be built having a relatively small tip which, because the heat therein is controlled, may be supported close to the handle without subjecting the operator's hands to excessive heat. Because of the lightness of this type of soldering iron, an operator may use it for long periods of time with little or no fatigue resulting therefrom, and because of the relative small size of the tip and the relatively short distance between the tip and the handle, an operator may use the soldering iron with a high degree of accuracy and efficiency.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. A temperature-controlled soldering iron for use with a remote control device for varying the electric power supplied to the soldering iron comprising a metal tip having a work area at one end and a recess extending inwardly from the other end, a metal tube having an end portion thereof secured to said tip in telescoping relation in said recess, a helical heating element telescopingly disposed in the end of said tube and within the recess in said tip and having one end thereof electrically connected to said tube, a conductor electrically connected to the other end of said helical heating element and extending axially within said tube, said conductor and said tube being connectible to a power circuit of a remote control unit, a thermocouple mounted in said recess of said tip adjacent the work area of said tip, and conductor means electrically connected to said thermocouple and extending axially therefrom connectible to a control circuit of the remote control device.

2. A temperature-controlled soldering iron for use with a remote control device for varying the electric power supplied to the soldering iron comprising a tip having a work area at one end and a recess extending inwardly from the other end, a tubular metal supporting member having one end disposed in said recess in telescoping relation with said tip, a heating element mounted in the end of said supporting member and having one end thereof electrically connected to said supporting member and the other end forming a conductor lead extending axially within said tubular supporting member, means for insulating said heating element and conductor lead from said tubular supporting member, said supporting member and said conductor lead being connectible to a power circuit of said remote control device, a thermocouple mounted in the recess in said tip in close proximity to the work area thereof, said tip having an axially disposed groove at the juncture with the supporting member, and conductor leads from said thermocouple extending axially through said groove in said tip and on the outside of said tubular supporting member and adapted to be connected to a control circuit of the remote control device.

3. A temperature-controlled slodering iron for use with a remote control device for varying the electric power supplied to the soldering iron comprising a metal tip having a work area at one end and a recess extending inwardly from the other end, a metal tube having an end portion thereof secured to said tip in telescoping relation in said recess, a hollow heating element telescopingly disposed in the end of said tube and within the recess in said tip and having one end thereof electrically connected to said tube, a thermocouple mounted in the recess in said tip adjacent the work area of said tip, means electrically connecting one side of said thermocouple to said tube, said tube being electrically connectible at the other end thereof to a power circuit and a control circuit of said remote control device and serving as a common supply conductor to said thermocouple and said heating element, a return conductor from said heating element extending axially within said tube and connectible to the power circuit of the remote control device, a return conductor from said thermocouple extending axially within said hollow heating element and said tube and connectible to the control circuit of the remote control device, and a handle on the tube.

4. A temperature-controlled soldering iron for use with a remote control device for varying the electric power supplied to the soldering iron comprising a metal tip having a work area at one end and a central recess extending inwardly from the other end and an annular recess extending inwardly from said other end in coaxial relation to said central recess, a metal tubular supporting member secured to said other end of the tip in telescoping relation thereto, a handle on said tubular supporting member, a coiled heating element mounted in the annular recess of said tip and insulated therefrom except for one end which is electrically connected to said tip, conductor means electrically connected to the other end of said heating element extending axially within said tubular supporting member, said tubular supporting member being electrically connected to said heating element and being connectible with said conductor means to a power circuit of the remote control device, a thermocouple mounted in said central recess of said tip in close proximity to the working area of said tip, and conductor means electrically connected to said thermocouple extending axially therefrom connectible to a control circuit of the remote control device.

5. In a temperature-controlled soldering iron for use with a remote control device for varying the electric power supplied to the soldering iron the combination of a metal tip having a work area at one end and a recess extending inwardly from the other end, said recess having a reduced end portion adjacent said work area, a metal tubular supporting member secured to said tip in telescoping relation therewith, a heating element disposed within the recess in said tip, a thermocouple mounted in the reduced portion of said recess in said tip adjacent the work area of said tip and in advance of said heating element, conductor means electrically connected to said heating element and connectible to a power circuit of said remote control device, and conductor means electrically connected to said thermocouple and connectible to a control circuit of said remote control device.

6. A soldering iron comprising a metal tip having a work area at one end and a recess extending inwardly thereof from the other end, said recess having a reduced end portion adjacent the work area, a heating element disposed within the recess in said tip, a thermocouple disposed in the reduced portion of said recess in the tip adjacent the work area of said tip and in axially spaced relation to said heating element, a metal tube having one end telescopingly engaging said tip for supporting said tip and having its other end connectible to a power circuit of a remote control device, a handle on said tube, means electrically connecting one end of said heating element to said one end of the tube, conductor means electrically connected to the other end of said heating element and extending axially within the tube and connectible to the power circuit of said remote control device, and conductor means electrically connected to said thermocouple and connectible to a control circuit of said remote control device.

7. In a light-weight soldering iron, the combination of a metal tip having a working surface, a heating element in said tip, a thermocouple in said tip disposed between said heating element and the working surface of said tip and in close proximity to said working surface, means including a handle for supporting said tip, conductors connected to said heating element and connectible to a power supply for heating said tip, and conductors connected to said thermocouple and connectible to a control circuit for controlling said power supply.

8. In a light-weight soldering iron the combination of a metal tip having a working surface at one end and a recess extending inwardly from the other end, a tube having an end portion secured to said tip in telescoping relation thereto and in co-axial relation to said recess, a heating coil in the recess in said tip, a thermocouple in the recess in said tip disposed between said heating element and the working surface of said tip and in close proximity to said working surface, conductor means connected to the ends of said heating coil and connectible to a power supply for heating said tip, and conductor means connected to said thermocouple and connectible to a control circuit for controlling the power supply, said last conductor means including a conductor element extending through said coil and said tube.

9. A light weight soldering iron comprising a metal tip having at its forward end a tapered working surface, a thermocouple in said tip disposed within the tapered portion thereof, a heating element in said tip disposed immediately behind said thermocouple and in close proximity to said working surface, means including a handle for supporting said tip, conductor means connected to said heating element and to a power supply for heating said tip, and control means for said power supply responsive to said thermocouple for maintaining the temperature of the working surface at such a value as to prevent over or underheating.

10. In a light-weight soldering iron the combination of a metal tip having a working surface, a thermocouple in said tip disposed in close proximity to said working surface, a heating element in said tip disposed in spaced relation to said thermocouple and spaced farther from said working surface than said thermocouple is spaced therefrom, means including a handle for supporting said tip, conductors connected to said heating element and connectible to a power supply for heating said tip, and conductors connected to said thermocouple and connected to a control circuit for controlling said power supply.

References Cited in the file of this patent

UNITED STATES PATENTS

| | | |
|---|---|---|
| 1,691,247 | Matthews | Nov. 13, 1928 |
| 2,104,749 | Jones | Jan. 11, 1938 |
| 2,159,869 | Thomas et al. | May 23, 1939 |
| 2,167,389 | Kuhn et al. | July 25, 1939 |
| 2,245,065 | Berger | June 10, 1941 |
| 2,304,211 | Sparrow | Dec. 8, 1942 |
| 2,456,030 | Sohns | Dec. 14, 1948 |

FOREIGN PATENTS

| | | |
|---|---|---|
| 420,482 | Great Britain | Dec. 3, 1934 |
| 452,937 | Great Britain | Sept. 2, 1936 |
| 560,806 | Great Britain | Apr. 20, 1944 |
| 588,216 | Great Britain | May 16, 1947 |